(12) United States Patent
Baudou et al.

(10) Patent No.: US 12,147,051 B2
(45) Date of Patent: Nov. 19, 2024

(54) HELMET-MOUNTED DISPLAY SYSTEM COMPRISING A HELMET-MOUNTED DISPLAY AND A MOVABLE VISOR COMPATIBLE WITH THE USE OF BINOCULARS

(71) Applicant: THALES, Courbevoie (FR)

(72) Inventors: Joël Baudou, Merignac (FR); Mathieu Balet, Merignac (FR)

(73) Assignee: THALES, Courbevoie (FR)

( * ) Notice: Subject to any disclaimer, the term of this patent is extended or adjusted under 35 U.S.C. 154(b) by 637 days.

(21) Appl. No.: 17/424,185

(22) PCT Filed: Dec. 18, 2019

(86) PCT No.: PCT/EP2019/086054
§ 371 (c)(1),
(2) Date: Jul. 20, 2021

(87) PCT Pub. No.: WO2020/160825
PCT Pub. Date: Aug. 13, 2020

(65) Prior Publication Data
US 2022/0091424 A1    Mar. 24, 2022

(30) Foreign Application Priority Data
Feb. 7, 2019 (FR) ..................... 1901161

(51) Int. Cl.
*G02B 27/01* (2006.01)
*G02B 23/12* (2006.01)

(52) U.S. Cl.
CPC ....... *G02B 27/0176* (2013.01); *G02B 23/125* (2013.01); *G02B 27/0172* (2013.01)

(58) Field of Classification Search
CPC ... G02B 27/01–0189; G02B 2027/0105–0198; G02B 23/18; G02B 23/125
See application file for complete search history.

(56) References Cited

U.S. PATENT DOCUMENTS

| | | | | |
|---|---|---|---|---|
| 2010/0128135 A1* | 5/2010 | Filipovich | ............ | G02B 23/125 348/217.1 |
| 2012/0120482 A1 | 5/2012 | Hedges et al. | | |
| 2012/0200918 A1* | 8/2012 | Rivkin | ................ | G02B 23/125 359/480 |

FOREIGN PATENT DOCUMENTS

EP    2 346 365 A1    7/2011

OTHER PUBLICATIONS

Cameron, et al., "Optical waveguide technology and its application in head-mounted displays", Head- and Helmet-Mounted Displays XVII; and Display Technologies and Applications for Defense, Security, and Avionics VI; SPIE, vol. 8383, No. 1, pp. 1-11, May 11, 2012.

(Continued)

*Primary Examiner* — Bao-Luan Q Le
*Assistant Examiner* — Christopher A Lamb, II
(74) *Attorney, Agent, or Firm* — BakerHostetler

(57) ABSTRACT

A helmet-mounted display system includes a helmet; detachable binoculars; a mechanical arch securely mounted on the front part of the helmet, the arch comprising: a display device; an optical position-detection device; a binocular attachment assembly; a movable visor having the following two main positions: a down use position, applied when the binoculars are not mounted, the visor covering the pupil-expansion combiner and leaving the optical position-detection device uncovered; an up use position, applied when the binoculars are mounted, the visor being situated on the top of the helmet and leaving the optical position-detection device uncovered.

12 Claims, 4 Drawing Sheets

(56) References Cited

OTHER PUBLICATIONS

Atac, et al., "Binocular Scorpion helmet-mounted display", Head- and Helmet-Mounted Displays XVI; Design and Applications, SPIE, vol. 8041, No. 1, May 13, 2011.
Parise, et al., "Symbology display unit night vision symbology for he AH-64 increasing mission effectiveness and safety", Proc. of SPIE, vol. 6224, 2006.

\* cited by examiner

HELMET-MOUNTED DISPLAY SYSTEM COMPRISING A HELMET-MOUNTED DISPLAY AND A MOVABLE VISOR COMPATIBLE WITH THE USE OF BINOCULARS

CROSS-REFERENCE TO RELATED APPLICATIONS

This application is a National Stage of International patent application PCT/EP2019/086054, filed on Dec. 18, 2019, which claims priority to foreign French patent application No. FR 1901161, filed on Feb. 7, 2019, the disclosures of which are incorporated by reference in their entirety.

FIELD OF THE INVENTION

The technical field of the invention is that of helmet-mounted display systems for aircraft pilots. More precisely, the field of the invention is that of systems combining both binoculars and a viewfinder or a helmet-mounted display.

BACKGROUND

A pilot's helmet may comprise three different viewing devices. These are a protective visor, a viewfinder or a helmet-mount display and binoculars which may be night-vision binoculars. Throughout the rest of the description, the term helmet-mounted display will refer equally to a helmet-mounted viewfinder or to a helmet-mounted display. The acronym "NVB" will also be used to refer to night-vision binoculars.

Night-vision binoculars capture the luminosity of objects in the near-infrared and render an image visible using light-intensification devices. They comprise two identical bodies. Each of the bodies comprises three main parts which are a lens, the light-intensifier device and an eyepiece. The visual field of NVBs given by the eyepiece is generally 40 degrees in diameter. To see the entirety of the intensified image, the eyepiece of the NVBs is generally positioned about 25 millimeters away from the eye.

A helmet-mounted display presents a synthetic or video image at infinity overlaid over the outside by means of a projection optic and an optical combiner or mixer. The image generally comes from a flat screen comprising a light source and its driver circuit board. The projection optic collimates the image diffused in the combiner. The combiner may be integrated into the helmet's visor. It may also be integrated into the helmet-mounted display. To decrease the dimensions of this element, pupil-expansion combiners are used. The combiner is then an optical plate made up of a plurality of prisms reflecting the light of the synthetic image toward the eye.

One of the difficulties is to make the NVBs and the helmet-mounted display operate simultaneously. Given their dimensions, the use of NVBs excludes the possibility of lowering the helmet's visor. Consequently, helmet-mounted displays implementing optical solutions with a combiner integrated into the visor are incompatible with wearing NVBs.

To solve this problem, a first solution consists in integrating a display at the level of one of the eyepieces of the NVBs, the eyepiece performing the overlaying of the intensified image and the synthetic image of the display. The disadvantage of this solution is that in daytime use, it is necessary to have a standalone second helmet-mounted display. The costs are therefore higher and the switch to night vision in flight is necessarily more difficult to perform.

A second solution is presented in the publication US 2012/0120482 entitled "Modular day mode/night mode helmet-mounted display". This solution allows the simultaneous use of the helmet-mounted display and the NVBs by virtue of a display device with a thin pupil-expansion combiner, this combiner being placed between the eye and the NVBs, as close as possible to the eyepiece.

During the day, a visor module is placed on the helmet and at night, the visor module is replaced with the NVBs. The helmet consists of a flight helmet with the visor removed and receptacles for the helmet-mounted display module are added.

The main drawback of this principle is the complexity in switching from daytime mode to night-time mode with the need to temporarily store two modules in the cockpit. This storage requires having locations close to the pilot, which is rarely the case in light aircraft or helicopter cockpits.

Another drawback of this system is due to the lateral tilt of the display device of the helmet-mounted display in order to allow the NVBs to be mounted. This tilt of the display device does not allow the whole of the available field to be used because the image has to be resized so as not to disrupt the pilot's view and interpretation with inclined contours of the synthetic image.

SUMMARY OF THE INVENTION

The display system according to the invention does not have the above disadvantages. It has two main advantages. It allows the night-vision binoculars to be fitted without having to remove the day visor. It just has to be raised. It is possible to adapt it to a standard helmet without having to modify the existing shell or visor, thus allowing substantial savings on the cost of the device.

More specifically, the invention relates to a helmet-mounted display system intended to be worn by a user, said display system comprising:
  a helmet;
  a mechanical arch securely mounted on the front part of said helmet, said arch comprising:
    a display device comprising a combiner;
    an optical position-detection device;
    a binocular attachment assembly;
    a movable visor;
  detachable binoculars comprising a holder for attachment to said mechanical arch;
  characterized in that the movable visor comprises two axes of rotation situated symmetrically on either side of the mechanical arch and at the height of the user's forehead, said visor having the following two main positions:
    a down use position, applied when the binoculars are not mounted in their holder, and in this down position, the visor covers the pupil-expansion combiner and leaves the optical position-detection device uncovered;
    an up use position, applied when the binoculars are mounted in their holder, and in this up position, the visor is situated on the top of the helmet and leaves the optical position-detection device uncovered.

Advantageously, the display device comprises a flat display screen, its light source, a collimating optic and a pupil-expansion optical combiner.

Advantageously, the binoculars are night-vision binoculars and comprise two identical bodies, each body comprising an eyepiece, when the holder for attaching the night-vision binoculars is mounted in the attachment assembly, the pupil-expansion combiner is located between a user's eye and one of the two eyepieces.

Advantageously, the mechanical arch is attached to the helmet by means of two attachment assemblies situated symmetrically on either side of the helmet, each attachment assembly comprising a spacer the thickness of which is matched to the size of the helmet, the mechanical arch being of one size.

Advantageously, the assembly for attaching the binoculars comprises a T-shaped groove and the holder for attaching the binoculars comprises a slide matched to the T-shaped groove.

Advantageously, the assembly for attaching the binoculars comprises a leaf spring which holds the slide when the latter is engaged in the T-shaped groove.

Advantageously, the night-vision binoculars comprising a power supply, the latter is integrated into the attachment holder.

Advantageously, the night-vision binoculars comprising a power supply, the latter is integrated into the mechanical arch, the attachment assembly comprising electrical connection means.

Advantageously, the night-vision binoculars comprising a power supply, the latter comes from the power supply for the display device.

Advantageously, the holder for attaching the binoculars comprises means for vertical translational adjustment, means for lateral translational adjustment or for adjusting interpupillary distance, means for longitudinal translational adjustment and means for rotational adjustment on an axis parallel to the axis passing through the two eyes.

Advantageously, at least the travel of the longitudinal translational adjustment is sufficient to allow the positioning of the eyepiece in front of the optical combiner.

Advantageously, the optical position-detection device comprises a camera arranged in the top part of the mechanical arch.

BRIEF DESCRIPTION OF THE DRAWINGS

The appended drawings illustrate the invention.

DETAILED DESCRIPTION

Figure 1:
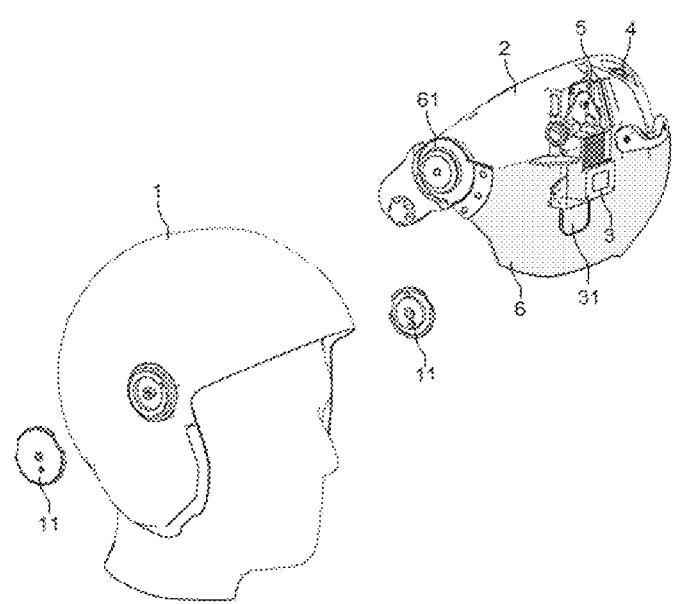
FIG. 1 shows an exploded view in perspective of the display system in daytime operation, without the night-vision binoculars.
Figure 2:
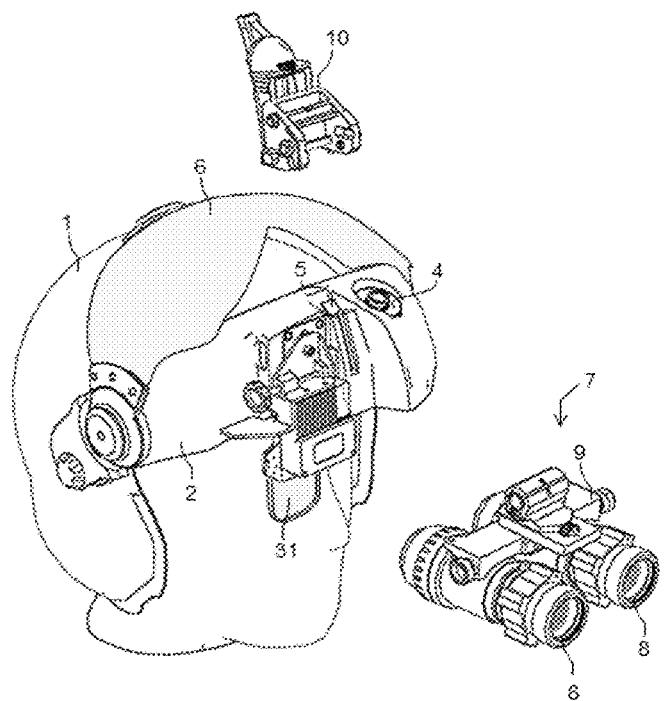
FIG. 2 shows an exploded view in perspective of the display system in night-time operation, with the night-vision binoculars.

By way of non-limiting example, the various FIGS. 1 to 6 show, in various perspective or profile views, a configuration of a display system according to the invention. This display system comprises binoculars. These may be day-vision binoculars or night-vision binoculars. When the binoculars are day-vision binoculars, they have a magnification other than 1. In what follows and by way of non-limiting example, it is considered that the binoculars are night-vision binoculars with a light intensifier. Their magnification is generally 1.

The helmet-mounted display system shown essentially comprises:
  a helmet 1;
  a mechanical arch 2 securely mounted on the front part of the helmet, said arch comprising:
    a display device 3 comprising a pupil-expansion combiner 31;
    an optical position-detection device 4;
    an assembly 5 for attaching night-vision binoculars;
    a movable visor 6;
  detachable night-vision binoculars 7 comprising:
    two identical bodies 8 providing light amplification;
    adjustment means 9;
    a holder 10 for attachment to the mechanical arch 2.

These various subassemblies are described in detail below.

The helmet 1 may be a standard helmet adapted specifically for the display system according to the invention. It essentially comprises a protective shell. To match different human head morphologies, this shell is available in a plurality of sizes. Similarly, the shell comprises a foam covering, the thickness of which may be adjusted according to head morphology.

The mechanical arch 2 has a curved shape so as to best match the shape of the helmet.

The mechanical arch 2 is securely mounted on the frontal front part of the helmet above the user's eyes. The attachments for the mechanical structure of the arch on the helmet are matched to the shape of the helmet and to its visor's mounting method. To minimize the number of different arches, its mechanical structure is produced in one size compatible with the largest helmet and visor size. Spacers 11 added to the interfaces for mounting the arch compensate for the different helmet shapes and sizes. They are shown in FIG. 1.

The mechanical arch 2 serves as a holder for four subassemblies which are a display device 3, an optical position-detection device 4, an assembly 5 for attaching the night-vision binoculars and a movable visor 6. In the various figures, the display device 3 is mounted on the right, the attachment assembly 5 is mounted in the center and slightly offset to the left and the optical position-detection device is mounted on the top left part of the arch 2. Other arrangements are possible depending on the structure of the various subassemblies and the configuration of the cockpit. The display device is monocular. It would be possible to envisage a binocular version.

The display device 3 comprises a high-resolution microdisplay which displays a synthetic image or a video image, its light source and its driver circuit board. A collimating optic forms an image at infinity of the microdisplay. A pupil-expansion combiner 31 returns this image to the user's eye. The viewing field of the display device is generally rectangular.

The overall display device thus has a reduced bulk and may be housed under the visor and be compatible with the use of binoculars.

A pupil-expansion combiner is a thin optical plate with planar and parallel faces into which is inserted a plurality of half-silvered mirrors which are inclined and parallel to one another. The thickness of the combiner is a few millimeters. By virtue of this arrangement, it is possible to obtain, in a compact manner, a pupil with dimensions sufficient for viewing. The distance separating the combiner from the eye is of the order of 25 millimeters. This spacing may be obtained by modifying the thickness of the inside covering of the shell.

The display device may also comprise adjustments that make it possible to compensate for variations in interpupillary distance that exist between different viewers and vertical differences in distance between the eyes and the top of the skull. These differences are between two and three centimeters between different users.

The optical position-detection device 4 has a number of uses. It allows the image displayed by the display device to be adjusted. It makes it possible to control a certain number of systems on board the aircraft, such as certain imaging sensors or certain weapon systems.

By way of example, this device is a wide-field, high-resolution microcamera which detects specific test patterns arranged at known locations in the cockpit. The position and orientation of these test patterns in the image make it possible to determine the position and orientation of the camera and, consequently, of the helmet on which the camera is mounted. It is therefore essential that the visor does not cover this camera. Of course, the display system according to the invention is not limited just to this type of position detection.

It is essential that the assembly for attaching the binoculars which is to be coupled with the device for attaching said binoculars be straightforward to produce and that it allow the binoculars to be attached easily and quickly. There are various quick-mount devices for the holder for the NVBs on different helmets.

Figure 3:
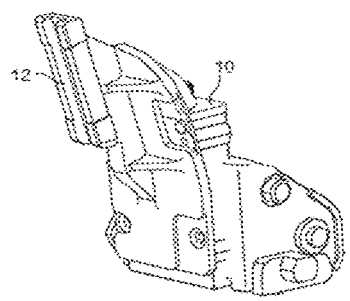
FIG. 3 shows a perspective view of the holder for attaching night-vision binoculars.
Figure 4:
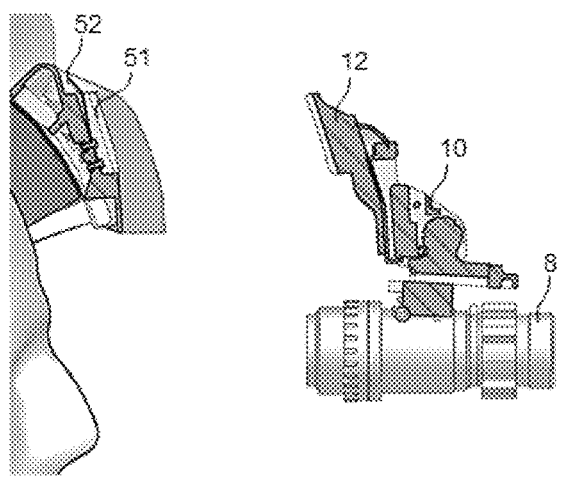
FIG. 4 shows a side view of the mounting of the attachment holder in its attachment assembly.
Figure 5:
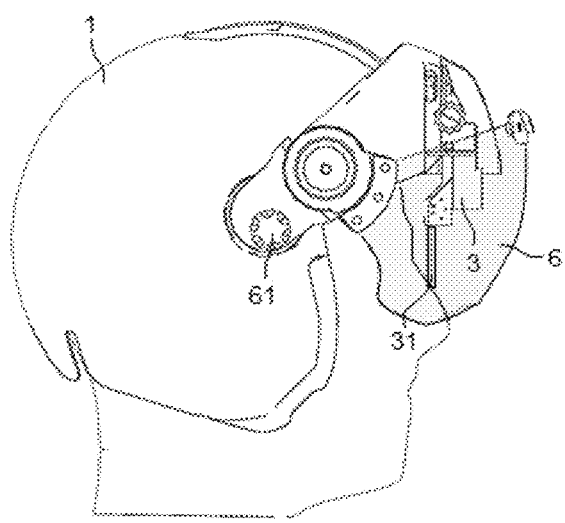
FIG. 5 shows a side view of the helmet equipped with its display device in daytime mode, visor down.
Figure 6:
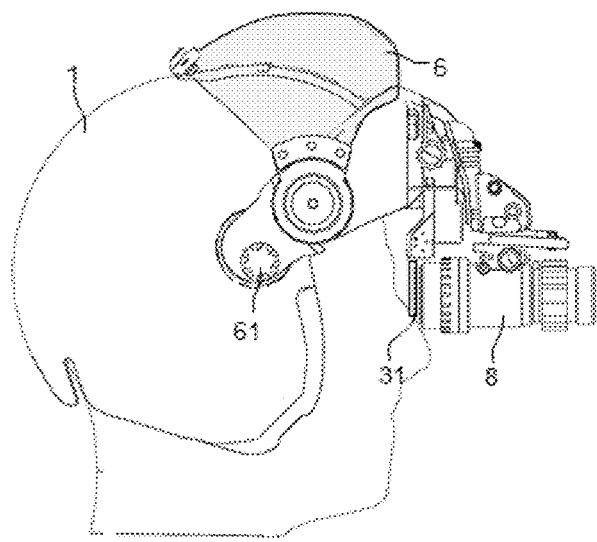
FIG. 6 shows a side view of the helmet equipped with its display device and night-vision binoculars in night-time mode, visor up.

By way of example, the quick-mount presented, in particular in FIGS. 3 and 4, is narrower than the existing devices and is slightly offset to the left-hand side of the helmet because of the presence of the optical detection device 4 and of the display device 3 arranged in front of the user's right eye.

This quick-mount consists of a T-shaped slide 12 previously joined to the back of the holder 10 for the night-vision binoculars and of a T-shaped groove 51 made in the mechanical structure of the arch. A retractable leaf spring 52 retains the slide 12 when it is fully engaged in the groove 51.

The movable visor 6 is conventionally curved in shape. It has a mechanical and optical protection function. It may be tinted so as to form a sun or antilaser visor. If the helmet is an adapted standard helmet, it is advantageous to use the helmet's initial visor by relocating it to a position other than its initial position. This avoids the costs of developing and purchasing a specific visor.

This visor comprises two lateral pivots 61 which allow it to be rotated about an axis perpendicular to a longitudinal section plane of the helmet. These pivots 61 are mounted on the mechanical arch.

The position of the pivots 61 is important. They are arranged laterally level with the user's forehead. Specifically, the pivots must be arranged such that:
  in the down position, the night-vision binoculars not being mounted on the helmet, the visor 6 covers the display device 3 and protects the pilot's eyes while leaving the camera 4 of the optical detection device free. It should be noted that upward visual protection is provided by the bottom part of the arch. The profile view of FIG. 5 corresponds to this position of the visor 6;
  in the up position, the visor 6 being positioned on the top of the helmet and the night-vision binoculars being mounted, the visor does not cover this same camera 4. The profile view of FIG. 6 corresponds to this position of the visor.

This arrangement makes it possible to keep the visor on the helmet at all times, both in daytime and night-time use.

The detachable night-vision binoculars 7 comprise two identical bodies 8 proving light amplification, adjustment means 9 and a holder 10 for attachment to the mechanical arch 2.

When the binoculars are night-vision binoculars, each binocular body 8 comprises, in this order, a lens, a device for amplifying the light of the image given by the lens and an eyepiece forming an image at infinity of the intensified image.

When the night-vision binoculars 7 are mounted on the arch 2, it is essential that the pupils of the eyepieces are centered on the pupils of the pilot's eyes to the greatest possible degree. Taking account of the morphological differences between different users, adjustments are needed to obtain this result. Night-vision binoculars generally comprise four axes for adjustment which are vertical adjustment, lateral adjustment, longitudinal adjustment and angular adjustment.

The travel for vertical adjustment is generally about 30 millimeters, the travel for lateral adjustment or interpupillary distance is generally greater than 20 millimeters, the travel for longitudinal adjustment is generally greater than 25 millimeters and the travel for angular adjustment in the vertical plane is generally of the order of plus or minus 10°.

In order to free up as much space as possible for the display device between the helmet and the holder for the binoculars, the tilt and longitudinal adjustments are moved to the end of their travel and the eyepiece of the binoculars is placed against the combiner 31 also at 25 millimeters from the eye.

The holder 10 for attaching the night-vision binoculars is shown in the perspective view of FIG. 3 and in the side view of FIG. 4. As has been said, this holder 10 is coupled to the assembly 5 for attaching the binoculars by means of a slide (12)-groove (51) system, thus allowing quick and straightforward mounting.

The power supply for the NVBs is provided by batteries which may be integrated into the holder 10 for attaching the NVBs or in a housing at the rear of the helmet 1. In the latter case, electrical contacts fitted at the bottom of the groove 51 in the arch make the connection with the slide 12.

In another embodiment, the batteries may be integrated into the mechanical structure of the arch, on either side of the display device and of the position detection.

In a third embodiment, the power supply for the NVBs may be provided by the cable and the computer of the display device.

The invention claimed is:

1. A helmet-mounted display system intended to be worn by a user, said display system comprising:
  a helmet;
  a mechanical arch securely mounted on the front part of said helmet, said arch comprising:
  a display device comprising a combiner;
  an optical position-detection device;
  a binocular attachment assembly;
  a movable visor;
  detachable binoculars comprising a holder for attachment to said mechanical arch; wherein the movable visor comprises two axes of rotation situated symmetrically on either side of the mechanical arch and at the height of the user's forehead, said visor having the following two main positions:
- a down use position, applied when the binoculars are not mounted in their holder, and in this down position, the visor covers the combiner and leaves the optical position-detection device uncovered;
- an up use position, applied when the binoculars are mounted in their holder, and in this up position, the visor is situated on the top of the helmet and leaves the optical position-detection device uncovered.

2. The helmet-mounted display system as claimed in claim 1, wherein the display device comprises a flat display screen, its light source, a collimating optic and a pupil-expansion optical combiner.

3. The helmet-mounted display system as claimed in claim 1, wherein the binoculars are night-vision binoculars and comprise two identical bodies, each body comprising an eyepiece, when the holder for attaching the night-vision binoculars is mounted in the attachment assembly, the pupil-expansion combiner is located between a user's eye and one of the two eyepieces.

4. The helmet-mounted display system as claimed in claim 3, wherein the night-vision binoculars comprising a power supply, the latter is integrated into the attachment holder.

5. The helmet-mounted display system as claimed in claim 3, wherein the night-vision binoculars comprising a power supply, the latter is integrated into the mechanical arch, the attachment assembly comprising electrical connection means.

6. The helmet-mounted display system as claimed in claim 3, wherein the night-vision binoculars comprising a power supply, wherein power supplied by said power supply is also supplied to the display device.

7. The helmet-mounted display system as claimed in claim 1, wherein the mechanical arch is attached to the helmet by means of two attachment assemblies situated symmetrically on either side of the helmet, each attachment assembly comprising a spacer the thickness of which is matched to the size of the helmet, the mechanical arch being of one size.

8. The helmet-mounted display system as claimed in claim 1, wherein the assembly for attaching the binoculars comprises a T-shaped groove and in that the holder for attaching the binoculars comprises a slide matched to the T-shaped groove.

9. The helmet-mounted display system as claimed in claim 8, wherein the assembly for attaching the binoculars comprises a leaf spring which holds the slide when the latter is engaged in the T-shaped groove.

10. The helmet-mounted display system as claimed in claim 1, wherein the holder for attaching the binoculars comprises means for vertical translational adjustment, means for lateral translational adjustment or for adjusting interpupillary distance, means for longitudinal translational adjustment and means for rotational adjustment on an axis parallel to the axis passing through the two eyes.

11. The helmet-mounted display system as claimed in claim 10, wherein at least the travel of the longitudinal translational adjustment is sufficient to allow the positioning of the eyepiece in front of the optical combiner.

12. The helmet-mounted display system as claimed in claim 1, wherein the optical position-detection device comprises a camera arranged in the top part of the mechanical arch.

* * * * *